United States Patent [19]
Arn

[11] Patent Number: 5,533,547
[45] Date of Patent: Jul. 9, 1996

[54] BULKHEAD ENTRY FILLING

[75] Inventor: Robert W. Arn, Jacksonville, Fla.

[73] Assignee: Petroleum Containment, Inc., Jacksonville, Fla.

[21] Appl. No.: 523,080

[22] Filed: Sep. 1, 1995

[51] Int. Cl.6 ................................................. F16L 5/00
[52] U.S. Cl. ............................................. 137/360; 137/375
[58] Field of Search ................................. 137/360, 375, 137/237; 251/355

[56] References Cited

U.S. PATENT DOCUMENTS

| | | | |
|---|---|---|---|
| 2,097,063 | 10/1937 | Heller | 137/375 |
| 3,360,001 | 12/1967 | Anderson | 137/375 |
| 3,822,714 | 7/1974 | Doose | 137/375 |

*Primary Examiner*—A. Michael Chambers
*Attorney, Agent, or Firm*—Arthur G. Yeager

[57] ABSTRACT

A fitting sealing an intersection of a pipe passing through a wall includes an adapter assembly including an elongated threaded sleeve with an enlarged flange at one end, an adapter gasket, an O-ring and its support, and a nut threadedly joined to the sleeve to squeeze the O-ring and gasket against opposite sides of the wall. The adapter assembly fits concentrically around the pipe where it passes through the wall; and two generally hemispherical resilient covers enclose the portions of the adapter assembly on each side of the wall. Hose clamps at each end of each hemispherical cover connects the enlarged end portions to the adapter assembly and the other end portions to the pipe. One of the hemispherical covers has a pressure grease fitting thereon to allow the space between the covers and the adapter assembly to be filled with pressurized water repellent gel.

20 Claims, 3 Drawing Sheets

BULKHEAD ENTRY FILLING

TECHNICAL FIELD

This invention relates to the plumbing technology, and particularly to means for sealing the intersection where a pipe passes through a wall and there is need to prevent leakage and/or corrosion at that intersection.

BACKGROUND OF THE INVENTION

Environmental standards have tightened over the recent years in an effort to protect against soil pollution occurring because of leakage above and below ground levels of piping carrying pollutants, such as petroleum substances, wastes, acidic liquids, etc. In most instances underground containers are required to be increased in a second safety container that catches any leakage from the internal operating container. Pipelines leading into or out of the internal operating container must also be provided with special fittings to protect against leakage at the point of penetration of the container wall by the pipe. Some attempts have been made to develop fillings to prevent leakage into the soil where the pipe intersects the container wall, but they have been too costly, too bulky, or of poor quality.

It is an object of this invention to provide a novel bulkhead entry fitting. It is another object of this invention to provide a bulkhead entry fitting that employs a surrounding mass in the form of a water repellent gel to seal against leakage. Still other objects will become apparent in the following disclosures.

BRIEF SUMMARY OF THE INVENTION

This invention relates to a fitting for sealing the intersection of a pipe passing through a wall comprising a threaded adapter, an adapter, gasket, an O-ring support, and a nut threadedly joined together to form an adapter assembly designed to fit concentrically around said pipe where it passes through said wall; two generally hemispherical resilient covers adapted to enclose the portions of said adapter assembly on each side of said wall, and hose clamps at each end of each said hemispherical cover, one of said hemispherical covers having a pressure grease fitting thereon to allow the space between said covers and said adapter assembly to be filled with pressurized water repellent gel.

In specific and preferred embodiments the adapter and the adapter gasket are clamped against the wall on one side of the opening where the pipe passes through, and the O-ring support and the nut are clamped against the other side of the wall, while the cover encloses the adapter parts on both sides and forms a snugly fitting enclosure by reason of hose clamps around the cover. In a preferred embodiment the adapter, the O-ring support, and the nut are made of a stiff plastic material while the cover, the O-ring, and the gasket are made of a resilient elastomeric material. In another preferred embodiment wherein the potential leakage might be in water or an aqueous liquid, the cover of the fitting is filled with petrolatum under pressure. In still another preferred embodiment each half of the cover is a combination of a central hollow conical portion joined at one end to a large diameter cylindrical portion, and at the other end to a small diameter cylindrical portion.

BRIEF DESCRIPTION OF THE DRAWINGS

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

The features of this invention are best understood with reference to the numbers shown on the attached drawings.

Figure 1:
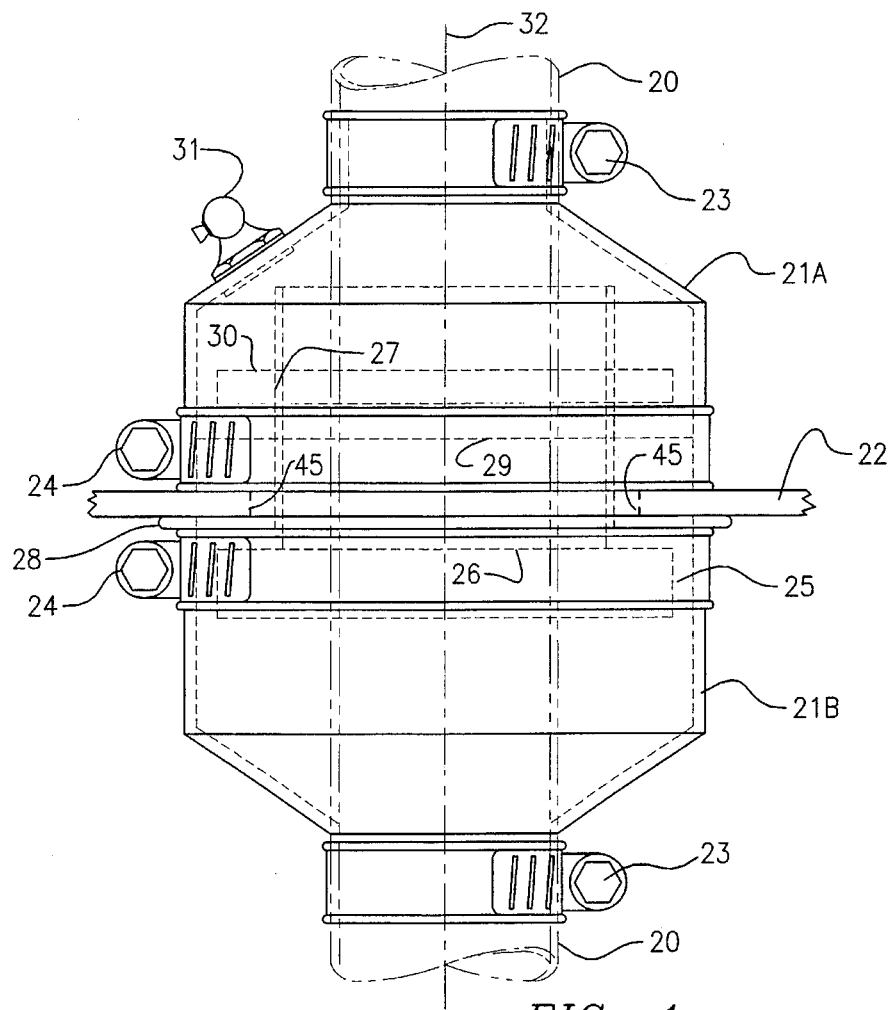
FIG. 1 is a front elevational view of the fitting of this invention.
Figure 2:
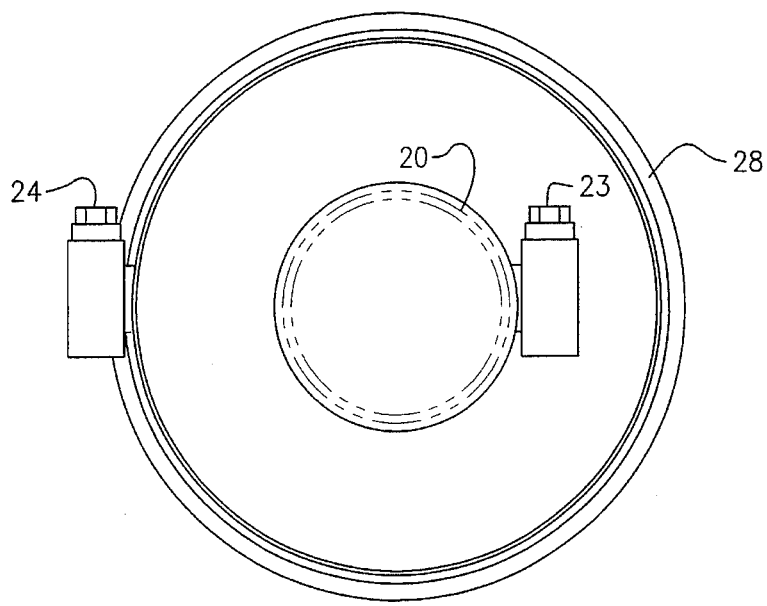
FIG. 2 is a top plan view of the fitting of this invention.

In FIGS. 1–2 there is shown the fitting of this invention applied to a pipe where it passes through a wall or bulkhead. Wall 22 is pierced by an opening 45 through which a pipe 20 passes. The fitting of this invention is applied to seal this intersection of pipe 20 and wall 22.

An internal adapter assembly is placed concentrically around longitudinal axis 32 of pipe 20, including adapter 25, adapter gasket 28, O-ring support 29, and nut 30. A two piece cover 21A and 21B is placed around the adapter assembly snugly against each side of wall 22 and clamped around pipe 20. The vacant spaces inside covers 21 A and 21 B are then filled with a water repellent gel through pressurized grease fitting 31, and the sealed fitting is complete.

In FIGS. 1–2 there is shown the entire fitting applied to a wall 22 to permit a pipe 20 to pass through. The adapter assembly is applied to pipe 20 on both sides of wall 22. Shoulder portion 26 of adapter 25 pushes adapter gasket 28 against the lower surface of wall 22. Tail portion 27 of adapter 25 extends through hole 45 in wall 22 to nut 30 which is connected to tail portion by reason of mating screw threads. O-ring support 29 is pushed against the upper face of wall 22 by tightening nut 30 against the upper surface of O-ring support. The two hemispherical covers 21 A and 21 B are placed over the adapter assembly on both sides of wall 22 and tightened in place by tightening hose clamps 23 above and below the fitting. This pushes the larger ends of hemispherical cover 21 A and 21 B snugly against opposite sides of wall 22. Large hose clamps 24 are then tightened around the interior structures of the adapter assembly; namely O-ring support above wall 22 and shoulder portion 26 of adapter 25 below wall 22. Finally a grease gun is applied to grease fitting 31 and the interior spaces of the fitting are filled with a water repellent gel. It may be necessary to temporarily loosen one or both small hose clamps 23 to allow the escape of interior air while filling the interior with a water repellent gel. Of course, when the water repellent gel begins to exude from the slightly loosened hose clamp area, it is again tightened so that additional water repellent gel under pressure is applied to fitting 31 so as to maintain the space filled with the pressurized water repellent gel. The grease fitting 31 is normally disposed in an accessible internal space for convenience of checking and making repairs which may require reapplication of pressurized water repellent gel. Petrolatum has been found to be an acceptable water repellent gel for the purposes of this invention, but other gels may be found to be effective in differing conditions.

Figures 3, 4:
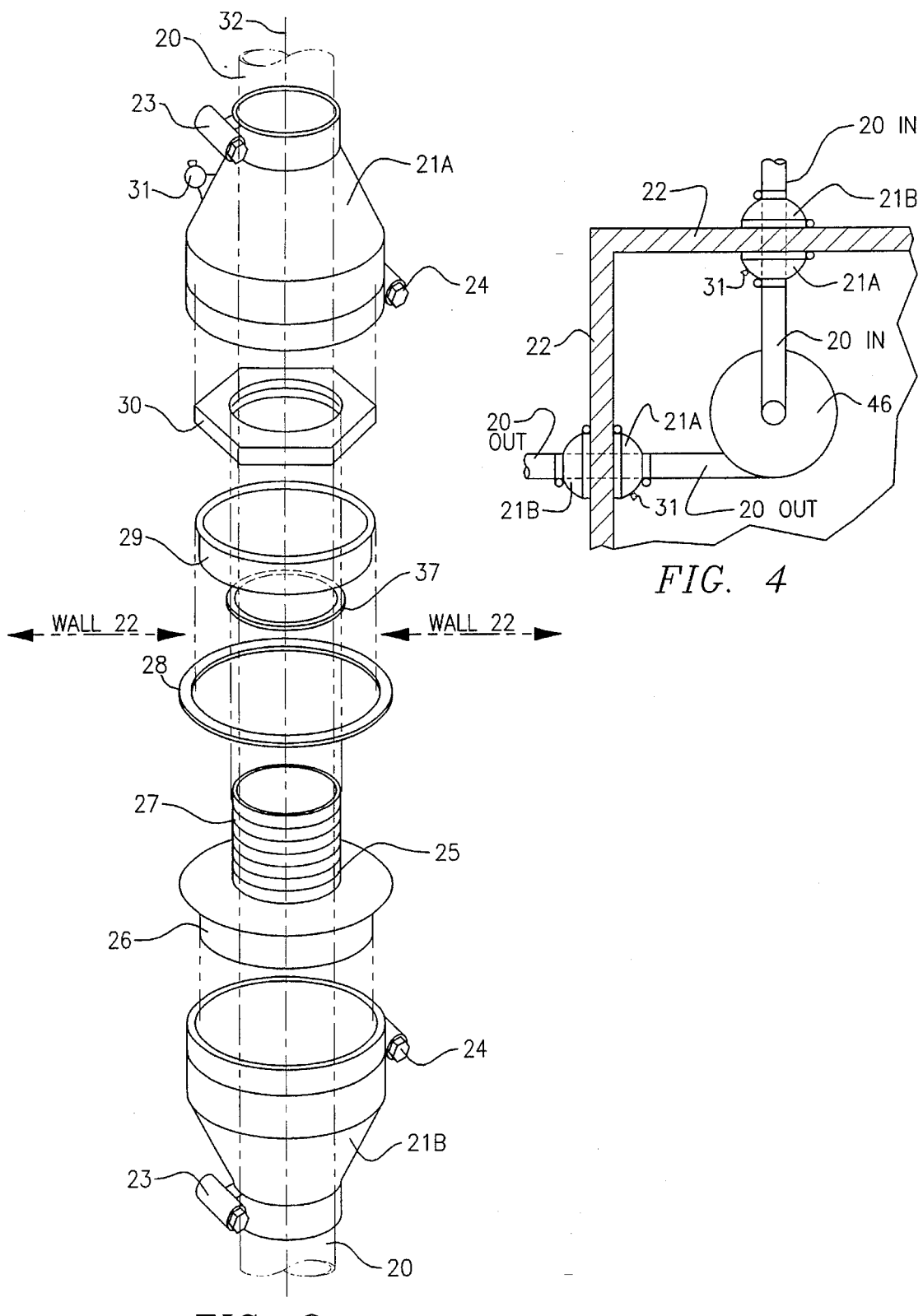
FIG. 3 is an exploded perspective view of the fitting of this invention.
FIG. 4 is a schematic cross-sectional view of two fittings of this invention.

FIG. 3 is an exploded view of the fitting applied to a through pipe 20 where it intersects a wall 22. This drawing shows the internal pieces forming the adapter assembly; namely a sleeve adapter 25, sealing means in the form of adapter gasket 28, and another sealing means including O-ring 37 and its support 29 and nut 30; and additionally shows the two covers 21 A and 21 B with clamping means in the form of hose clamps 23 and 24 on each. Only one grease fitting 31 is needed and may be present on either cover 21 A or 21 B. Although not needed, a grease fitting 31 may be on each of covers 21 A or 21 B, if desired.

FIG. 4 is a schematic illustration of a pump 46 in a safety containment characterized by two intersecting walls 22. The inlet line 20 IN and the outlet line 20 OUT must pass through walls 22 in order to connect pump 46 to appropriate parts of an apparatus. The fitting of this invention serves to cover each place where the pipe passes through the wall so as to seal it from leakage into or out of the containment represented by the walls 22. Many other instances of application for this invention are well known, such as any piping carrying liquids, gases, electric cables, mixtures of solids with liquid or gas, etc., which pass through walls and where that passage must be sealed so as to prevent leakage passing along the piping from one side of the wall to another. Each of these possible intersections is contemplated for sealing by the fitting of this invention.

Figure 5:
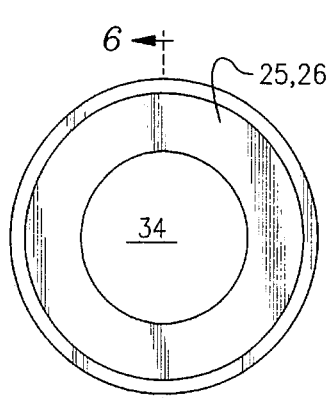
FIG. 5 is a top plan view of the adapter assembly of this invention.
Figure 6:
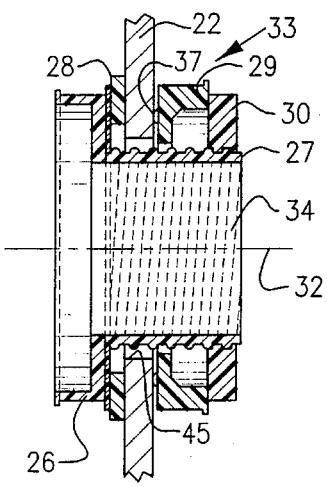
FIG. 6 is a cross-sectional view taken at 6—6 of FIG. 5.
Figure 7:
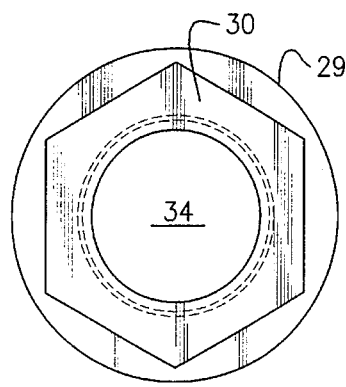
FIG. 7 is a bottom plan view of the adapter assembly of this invention.

The adapter assembly of this invention is shown in FIGS. 5–7, and each component of the adapter assembly is individually shown in FIGS. 8–16. In FIGS. 5–7 there is seen a wall 22 having an opening 45 therein large enough to allow the externally threaded sleeve or tail portion 27 of adapter 25 to pass through and sufficiently small to prevent shoulder portion 26 of adapter 25, sealing means in the form of adapter gasket 28, or another sealing means in the form of an O-ring 37 or its support 29 to pass through. As has been described above it may be seen that shoulder portion 26 of adapter 25 and adapter gasket 28 press against wall 22 from one side (left side in FIG. 6) while O-ring 37 via its support 29 and nut 30 press against wall 22 from the other side (right side in FIG. 6) about opening 45. All components of the adapter assembly have an internal hollow or passageway not less in diameter than that of hollow 34 of tail portion 27 of adapter 25. This permits the straight through passage of a pipe (not shown in FIG. 6, but shown as 20 in FIGS. 1–3). The tightness of nut 30 determines the tightness of the sealing components, i.e., gasket 28 and O-ring 37, of the adapter assembly against wall 22.

Figure 8:
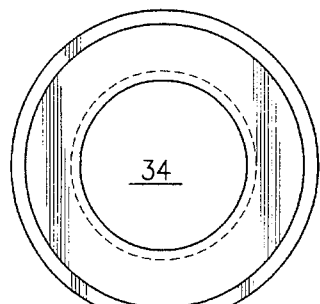
FIG. 8 is a top plan view of the adapter of this invention.
Figure 9:
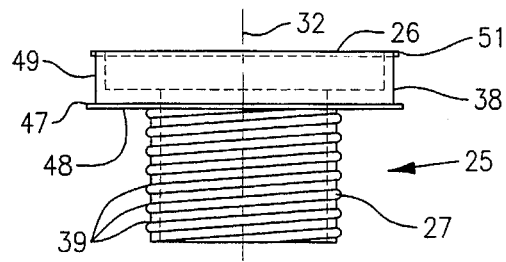
FIG. 9 is a front elevational view of the adapter of this invention.

FIGS. 8–9 depict the adapter component 25, which is a sleeve or tube with external threads smaller in diameter than that of the opening 45 in wall 22 and having a head or shoulder portion 26 which has a larger diameter than that of the opening 45 in wall 22. Shoulder portion 26 remains on one side of wall 22 while sleeve portion 27 extends through wall 22 and beyond for an appropriate distance on the other side of wall 22. Shoulder portion 26 is a short length of a tubular cylinder having a flange 47 with a planar wall 48 to lie parallel to wall 22 as a support for gasket 28 which lies directly against wall 22. The outside perimeter 49 of shoulder portion 26 forms a seat between flange 47 and small circular lip 51 for a similarly sized portion of cover 21 A or 21 B around which a large hose clamp 24 is tightened. Threads 39 are of any appropriate size and may be formed when the adapter is molded from plastic or may be machined or cut from a molded blank surface. These threads mate with those on the inside diameter of nut 30. Materials of construction preferably include moldable thermoplastic materials such as polyolefins, polyacetals, polycarbonates, polyamides, etc. Stainless steel or other noncorrodable metals are useful, but are costly and not preferred.

Figure 10:
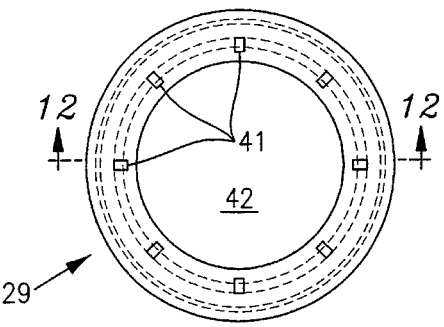
FIG. 10 is a top plan view of the O-ring support of this invention.
Figure 11:
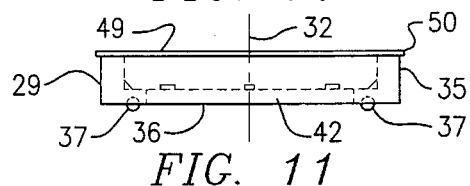
FIG. 11 is a front elevational view of the O-ring support of this invention.
Figure 12:
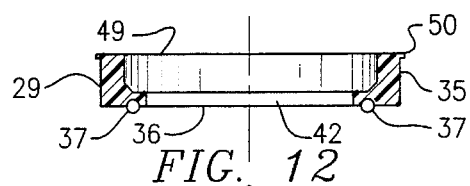
FIG. 12 is a cross-sectional view taken at 12—12 of FIG. 10.

FIGS. 10–12 show the details of the O-ring support 29 which is a shallow cup-like component with a transverse surface 36 perpendicular to central axis 32 of the adapter assembly (see FIGS. 5–7), and of the fitting assembled around pipe 20 (see FIGS. 1–3). Transverse surface 36 has a circular groove molded or machined into it to function as a seat for an O-ring 37 which is partly enclosed by the O-ring adapter, but leaves a portion of the O-ring 37 to protrude outwardly from surface 36 so as to form a seal against wall 22 when nut 30 is tightened. There is a perimetral surface 35, generally concentric and cylindrical around axis 32 and perpendicular to transverse surface 36 forming a seat with circular lip 50 for cover 21 A or 21 B which is clamped thereto by a large hose clamp 24 (see FIGS. 1–3). Lip 50 of support 29 and lip 51 of adapter 25 are outwardly directed from the respective seats so as to inhibit removal of the respective cover 21 A or 21 B until release of respective hose clamps 24. In order to strengthen this component it may be desirable to have corner reinforcements 41 at the inside corner where the wall containing transverse surface 36 meets the wall having perimetral surface 35. This component, like adapter 25 preferably is made of a moldable thermoplastic material, or if desired, may be made of metal.

Figure 13:
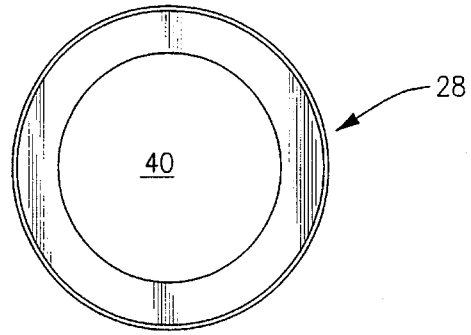
FIG. 13 is a top plan view of the adapter gasket of this invention.
Figure 14:
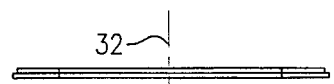
FIG. 14 is a front elevational view of the adapter gasket of this invention.

FIGS. 13 and 14 show the adapter gasket 28 of the adapter assembly. This component is a simple washer-like gasket of thin resilient sheet material having an internal passageway 40 slightly larger in diameter than sleeve portion 27 of adapter 25, so that sleeve portion 27 may pass through easily. This gasket 28 lies flat against wall 22 and is backed by surface 48 of adapter 25 so as to form a tight seal. This gasket component is preferably made of a thin elastomeric material that will distort easily so as to fit tightly against any deformities in wall 22.

Figure 15:
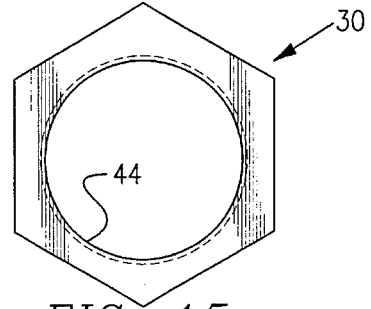
FIG. 15 is a top plan view of the nut of this invention.
Figure 16:
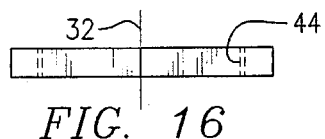
FIG. 16 is a front elevational view of the nut of this invention.

FIGS. 15 and 16 show nut 30 which has internal threads that will mate with external threads 39 on tail portion 27 of adapter 25. The outer contour of nut 30 can take any shape that is convenient, generally a polygon of parallel flat sides such as a square, hexagon (as shown in FIG. 15), octagon, etc., that can receive a wrench for turning nut 30 in tightening or loosening it. Nut 30 generally is tightened against O-ring support 29, specifically contiguous to surface 49 thereof so as to tighten O-ring 37 against wall 22 on one side thereof and to tighten by pulling shoulder portion 26 of adapter 25 and gasket 28 against the other side of wall 22. This nut component, like adapter 25 and O-ring support 29, is preferably made of a stiff thermoplastic material, or alternatively, of a metal.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. A fitting for sealing the intersection of a pipe passing through a wall comprising a threaded adapter, an adapter gasket, an O-ring support, and a nut threadedly joined together to form an adapter assembly designed to fit concentrically around said pipe where it passes through said wall; two generally hemispherical resilient covers adapted to enclose the portions of said adapter assembly on each side of said wall, and hose clamps at each end of each said hemispherical cover, one of said hemispherical covers having a pressure grease fitting thereon to allow the space between said covers and said adapter assembly to be filled with pressurized grease.

2. The fitting of claim 1 wherein said adapter has an elongated tubular tail section of smaller diameter with external threads thereon and shoulder section of larger diameter and adapted to receive one of said hemispherical covers thereover tightened against said shoulder section by a hose clamp.

3. The fitting of claim 2 wherein said adapter shoulder section and said adapter gasket are on one side of said wall and said O-ring support said adapter tail section, and said nut are on the other side of said wall.

4. The fitting of claim 1 wherein said hemispherical cover has a large diameter opening adapted to lie contiguous to said wall and a small diameter opening parallel to said bulkhead and spaced apart therefrom, each said opening having a perimeter seat adapted to receive a hose clamp therearound.

5. The fitting of claim 4 wherein O-ring support is a circular ring having a longitudinal face adapted to fit inside said large diameter opening of said hemispherical cover and to function as a backing for a hose clamp around said large opening; and a transverse face perpendicular to said longitudinal face and having a seat therein for an elastomeric O-ring that will protrude above said transverse face and be pressed against said wall.

6. The fitting of claim 1 wherein said adapter, said O-ring holder, and said nut are made of a tough, stiff plastic material.

7. The fitting of claim 1 wherein said hemispherical cover is the combination of a large diameter cylindrical portion, a small diameter cylindrical portion, and a hollow conical portion joining said two cylindrical portions.

8. A fitting for sealing the opening in a bulkhead where a pipe passes through that opening, the fitting comprising an adapter assembly fitting concentrically around said pipe and a resilient two-piece cover substantially spherical in shape fitting around said adapter assembly, clamped to said pipe and abutting snugly against said wall on both sides of said wall at said opening; said adapter assembly including an adapter, an adapter gasket, an O-ring holder and clamp support, and a nut; said adapter being an elongated tubular member having a tail section with external screw threads and a shoulder section having a diameter slightly smaller than the diameter of said spherical cover; said adapter gasket being a flat washer-like ring fitting around said pipe and sandwiched between said wall and said shoulder section of said adapter; said O-ring support being a ring having a cylindrical outside surface of substantially the same diameter as that of said shoulder section of said adapter and transverse planar surface perpendicular to said cylindrical outside surface, and an O-ring seated in a circular groove on said transverse surface with said O-ring protruding slightly outside of said transverse surface when said O-ring is seated in said groove; and said nut having an internally threaded cylindrical surface adapted to mate with said screw threads on said tail section of said adapter; said two-piece cover comprising two complementary members substantially hemispherical in shape, each having a large circular opening adapted to lie flat against opposite sides of said wall and a short tubular opening spaced away from said large circular opening and adapted to fit snugly around said pipe, one of said hemispherical cover members having a fitting to permit a grease gun to force pressurized grease inside said cover sufficient to fill all vacant space inside said complementary members; a pair of large hose clamps around respective hemispherical cover member perimeter to clamp said cover to said adapter and said O-ring support, and a pair of small hose clamps around said respective short tubular opening to clamp said cover members to said pipe.

9. The fitting of claim 8 wherein said adapter, said O-ring support, and said nut, are made of a stiff molded plastic material.

10. The fitting of claim 8 wherein said two-piece cover and said adapter gasket are made of resilient elastomeric material.

11. The fitting of claim 8 wherein each said complementary hemispherical member is a coaxial combination of a tubular conical portion joined to a large diameter cylindrical portion at one end thereof and to a small diameter cylindrical portion at the other end thereof.

12. A fitting combination for sealing the intersection of a pipe passing through an opening in a wall comprising an adapter assembly, said assembly including an elongated sleeve adapter, extending through said opening and having a circular flange portion extending radially beyond said opening seal means engaged between said flange portion and said wall about said opening on one side of said wall, means engaged with said sleeve to compress said seal means and to seal against another side of said wall, said pipe being adapted to pass through said sleeve, two generally hemispherical resilient covers having an end portion and an enlarged end portion and adapted to enclose portions of said adapter respectively on each side of said wall, and a pair of clamping means adjacent said wall engaged with said enlarged end portions to tightly secure said covers to said adapter assembly, another pair of clamping means remote from said wall respectively engaged with said end portions to tightly secure said covers to said pipe, one of said hemispherical covers having a grease fitting means therethrough to allow space between said covers and said adapter assembly to be filled with pressurized grease with said pipe passing therethrough.

13. The fitting combination of claim 12 further including pressurized grease in the form of a water repellent gel.

14. The fitting combination of claim 12 wherein said grease fitting means includes a check valve to inhibit any backflow of grease from the pressurized space.

15. The fitting of claim 12 wherein said sleeve includes external threads, said means engaged with said sleeve include an internally threaded nut engaged with said external threads to compress said seal means against one side of said wall.

16. The fitting combination of claim 14 wherein said means engaged with said sleeve includes another seal means engaged with said another side of said wall.

17. The fitting combination of claim 16 wherein said another seal means is an O-ring.

18. The fitting combination of claim 16 wherein said means engaged with said sleeve includes another circular flange portion generally the same size as said flange portion, said enlarged end portions overlying respective said circular flange portion and said circular another flange portion, said pair of clamping means including hose clamps to releasably secure said enlarged end portions of said covers to respective said flange portions.

19. The fitting combination of claim 18 wherein said another pair of clamping means includes hose clamps to releasably secure said end portions of said covers to said pipe.

20. The fitting combination of claim 18 wherein each said flange portion includes an outwardly directed means for inhibiting removal of said cover until release of said hose clamps.

* * * * *